(12) United States Patent
Nishio et al.

(10) Patent No.: US 10,455,523 B2
(45) Date of Patent: Oct. 22, 2019

(54) WIRELESS COMMUNICATION TERMINAL DEVICE AND METHOD FOR CONTROLLING TRANSMISSION POWER

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 1142 days.

(21) Appl. No.: 14/368,766

(22) PCT Filed: Jan. 16, 2013

(86) PCT No.: PCT/JP2013/000169
§ 371 (c)(1),
(2) Date: Jun. 25, 2014

(87) PCT Pub. No.: WO2013/114799
PCT Pub. Date: Aug. 8, 2013

(65) Prior Publication Data
US 2014/0376471 A1 Dec. 25, 2014

(30) Foreign Application Priority Data

Jan. 30, 2012 (JP) ................................ 2012-016409

(51) Int. Cl.
*H04W 52/30* (2009.01)
*H04W 72/04* (2009.01)
(Continued)

(52) U.S. Cl.
CPC ......... *H04W 52/30* (2013.01); *H04W 52/367* (2013.01); *H04L 5/001* (2013.01); *H04L 5/0064* (2013.01); *H04W 72/0446* (2013.01)

(58) Field of Classification Search
CPC ...... H04L 5/001; H04L 5/0064; H04W 52/30; H04W 52/367; H04W 72/0446
See application file for complete search history.

(56) References Cited

U.S. PATENT DOCUMENTS 9,521,632 B2 12/2016 Narasimha et al.
2010/0027512 A1 2/2010 Kishiyama et al.
(Continued)

FOREIGN PATENT DOCUMENTS

CN 103167594 A 6/2013
CN 104025675 A 9/2014
(Continued)

OTHER PUBLICATIONS

Pro 61591050—Method and Apparatus for Controlling Transmissions on Multiple Component Carriers With Multiple Timing Advances (Year: 2012).*

(Continued)

*Primary Examiner* — Andrew Lai
*Assistant Examiner* — M Mostazir Rahman
(74) *Attorney, Agent, or Firm* — Seed IP Law Group LLP

(57) ABSTRACT

The present invention prevents an increased error rate, degradation of reception-quality estimation precision, and complication of control in an operation for independently controlling, for individual component carriers (CC), transmission timing of an uplink subframe. When a radio communication terminal device independently controls the subframe transmission timing for individual CCs, and a portion of the total transmission power where overlap exists between the trailing-end portion of a subframe of a CC and (Continued)

a leading-end portion of a subframe of another CC exceeds a tolerance, the terminal device controls the timing such that the transmission power of a symbol including the overlapping portion is reduced.

18 Claims, 13 Drawing Sheets

(51) Int. Cl.
*H04W 52/36* (2009.01)
*H04L 5/00* (2006.01)

(56) References Cited

U.S. PATENT DOCUMENTS

| | | | | |
|---|---|---|---|---|
| 2011/0243111 | A1* | 10/2011 | Andgart | H04W 56/0045 370/338 |
| 2012/0039273 | A1* | 2/2012 | Nam | H04L 5/0005 370/329 |
| 2012/0257519 | A1* | 10/2012 | Frank | H04L 5/0035 370/252 |
| 2013/0044831 | A1 | 2/2013 | Narasimha et al. | |
| 2013/0114505 | A1* | 5/2013 | Haim | H04W 52/146 370/328 |
| 2013/0215849 | A1* | 8/2013 | Heo | H04W 52/365 370/329 |
| 2013/0272257 | A1* | 10/2013 | Takaoka | H04W 52/42 370/329 |
| 2014/0314014 | A1 | 10/2014 | Zhang et al. | |

FOREIGN PATENT DOCUMENTS

| | | |
|---|---|---|
| JP | 2012-216968 A | 11/2012 |
| WO | 20081084719 A1 | 7/2008 |

OTHER PUBLICATIONS

61555852—Method and Apparatus for Controlling Pro Transmissions on Multiple Component Carriers With Multiple Timing Advances (Year: 2012).*
Chinese Search Report, dated Apr. 28, 2017, for corresponding Chinese Application No. 2013800069176, 2 pages.
3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)," Mar. 2011, 103 pages.
3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)," Mar. 2011, 76 pages.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.
International Search Report dated Apr. 23, 2013, for corresponding International Application No. PCT/JP2013/000169, 4 pages.
Panasonic, "PDCCH interference Mitigation Scheme for HetNet," R1-104912, Agenda Item: 6.8.1, 3GPP TSG RAN WG1 Meeting #62, Madrid, Spain, Aug. 23-27, 2010, 5 pages
Samsung, "SRS Multiplexing in Carrier Aggregation," R1-106018, Agenda Item: 6.2.4, 3GPP TSG RAN WG1 #63, Jacksonville, USA, Nov. 15-19, 2010, 4 pages.

* cited by examiner

WIRELESS COMMUNICATION TERMINAL DEVICE AND METHOD FOR CONTROLLING TRANSMISSION POWER

TECHNICAL FIELD

The present invention relates to a radio communication terminal apparatus and a transmission power control method of a mobile communication system in which a transmission timing of an uplink subframe is controlled for each component carrier (CC).

BACKGROUND ART

In 3rd Generation Partnership Project (3GPP), in order to achieve high-speed and large-capacity communication between a radio communication base station apparatus (hereinafter, abbreviated as a "base station") and a radio communication terminal apparatus (hereinafter, abbreviated as a "terminal"), Long Term Evolution (LTE) and LTE-Advanced have been standardized, and standardization for further enhancement has been in progress.

In LTE and LTE-Advanced, Orthogonal Frequency Division Multiple Access (OFDMA) has been employed as a downlink communication scheme, and Single Carrier Frequency Division Multiple Access (SC-FDMA) has been employed as an uplink communication scheme (see Non-Patent Literature (hereinafter, abbreviated as NPLs) 1, 2, and 3, for example).

The channels and signals used in uplink communication include a Physical Uplink Shared Channel (PUSCH), a Physical Uplink Control Channel (PUCCH), and a Sounding Reference Signal (SRS), and the like. The PUSCH is a channel by which data signals are transmitted. The PUCCH is a channel by which control information such as ACK/NACK information or CQI information is transmitted. The SRS is a reference signal used to measure a channel quality in a base station.

The base station allocates a resource block (RB) used to transmit the PUSCH and PUCCH to each terminal in units of subframes. Further, the base station sets a cycle, timing and bandwidth used to transmit the SRS. Note that, a subframe (1 ms) typically consists of 14 SC-FDMA symbols (71.3 μs) (hereinafter, abbreviated as "symbols").

The terminal transmits the PUSCH and PUCCH using the RB and the subframe allocated by the base station. The terminal transmits the SRS using one symbol at the end of a subframe at the cycle, timing, and bandwidth set by the base station. The terminal transmits the PUSCH and PUCCH using 13 symbols excluding the symbol at the end in the subframe for transmitting the SRS.

The terminal controls transmission power of the PUSCH, PUCCH, and SRS in units of subframes.

Transmission power $P_{PUSCH}(i)$ [dBm] of the PUSCH is obtained by Equation 1 below. In Equation 1, "i" represents a subframe number, $P_{CMAX,C}(i)$ indicates permissible transmission power, $M_{PUSCH}(i)$ is a transmission bandwidth (the number of RBs) allocated to the PUSCH, $P_{O\_PUSCH}$ is a transmission power offset value (a transmission power initial value of PUSCH) indicated by the base station, PL represents a path loss measured by the terminal, α represents a weighting coefficient (a value of 0 to 1) indicating a compensation ratio of a path loss indicated by the base station, $\Delta_{TF}(i)$ is an offset value that depends on a modulation scheme or the like, and f(i) represents an offset value according to a TPC command indicated by the base station.

[1]
$$P_{PUSCH}(i)=\min\{P_{CMAX},10\log_{10}(M_{PUSCH}(i))+P_{O\_PUSCH}(j)+\alpha(j)\cdot PL+\Delta_{TF}(i)+f(i)\}$$ (Equation 1)

Transmission power $P_{PUCCH}(i)$ [dBm] of the PUCCH is obtained by Equation 2 below. In Equation 2, $P_{O\_PUCCH}$ represents a transmission power offset value (a transmission power initial value of the PUCCH) indicated by the base station, $h(n_{CQI},n_{HARQ},n_{SR})$ represents an offset value that depends on information or a format transmitted through the PUCCH, $\Delta_{F\_PUCCH}(F)$ represents an offset value indicated by the base station, and g(i) represents an offset value according to a TPC command indicated by the base station.

[2]
$$P_{PUCCH}(i)=\min\{P_{CMAX},P_{O\_PUCCH}+PL+h(n_{CQI},n_{HARQ})+\Delta_{F\_PUCCH}(F)+g(i)\}$$ (Equation 2)

Transmission power $P_{SRS}(i)$[dBm] of the SRS is obtained by Equation 3 below. In Equation 3, $P_{SRS\_OFFSET}$ represents a transmission power offset value on the transmission power of the PUSCH indicated by the base station, and $M_{SRS}(i)$ represents a transmission bandwidth (the number of RBs) allocated to the SRS.

[3]
$$P_{SRS}(i)=\min\{P_{CMAX},P_{SRS\_OFFSET}+10\log_{10}(M_{SRS}(i))+P_{O\_PUSCH}+\alpha\cdot PL+f(i)\}$$ (Equation 3)

LTE-Advanced Release 10 (hereinafter, abbreviated as a "Rel.10") supports carrier aggregation (CA) in which a plurality of component carriers (hereinafter, abbreviated as "CCs") each having a frequency bandwidth of a maximum of 20 MHz (that is, a maximum frequency bandwidth in LTE) as a basic unit are aggregated and operated. CA in Rel.1 does not support simultaneous transmission of PUCCH and SRS or PUSCH and SRS. For this reason, when setting or allocation for simultaneous transmission of PUSCH or PUCCH and SRS is indicated by the base station, the terminal does not transmit (drops) the SRS in a corresponding subframe.

Further, in Rel.10, when the sum of transmission power calculated by Equations 1 to 3 exceeds a permitted value for simultaneous transmission of PUCCH and PUSCH between CCs, power is preferentially allocated to the PUCCH, and power of the PUSCH is reduced. The permitted value of the transmission power of the terminal is maximum power supported by the terminal or permissible transmission power (a maximum value) indicated by the base station.

CITATION LIST

Non-Patent Literature

NPL 1
3GPP TS 36.211 V10.1.0, "Physical Channels and Modulation (Release 10)," March 2011
NPL 2
3GPP TS 36.212 V10.1.0, "Multiplexing and channel coding (Release 10)," March 2011
NPL 3
3GPP TS 36.213 V10.1.0, "Physical layer procedures (Release 10)," March 2011

SUMMARY OF INVENTION

Technical Problem

In Release 11 (hereinafter, referred to as "Rel.11"), which is the next release of LTE-Advanced, an operation (multiple timing advance (TA)) of independently controlling a transmission timing of an uplink subframe for each CC has been examined. For example, when reception is performed at receiving points of locations different from one another according to respective CCs (by receiving apparatuses such as receiving antennas or remote radio heads (RRHs) at different positions), the transmission timing varies for each CC because the propagation delay between the receiving point (base station) and transmitting point (terminal) varies according to each CC.

In such an operation, there are cases where, among a plurality of CCs, a rear end portion of a subframe of a certain CC temporally overlaps a front end portion of a subframe of another CC, and the sum of transmission power in the overlapping portion exceeds a permitted value.

In this case, controlling the transmission power in a uniform manner so as to lower the transmission power of the entire subframe to prevent the sum of transmission power from exceeding the permitted value although the overlapping portion is only a part of the subframe results in an excessive reduction of the transmission power and thus causes an increase in the error rate of PUSCH or PUCCH or deterioration of the reception quality estimation accuracy using an SRS.

Further, transmission power control to prevent the transmission power from exceeding the permitted value for each time sample in accordance with overlapping of channels or signals between subframes requires a frequent control of a transmission amplifier or the like of the terminal and thus leads to complication of the control in the terminal.

The present invention proposes prevention of an increase in the error rate of PUSCH or PUCCH, deterioration in the reception quality estimation accuracy using an SRS, and complication of control in the terminal in an operation that controls a transmission timing of an uplink subframe for each CC.

Solution to Problem

A radio communication terminal apparatus according to an aspect of the present invention includes: a control section that controls a transmission timing and transmission power of a subframe for each component carrier (CC); and a transmitting section that transmits a signal at the controlled transmission timing and transmission power, in which the control section controls the transmission power in units of symbols such that a sum of the transmission power is equal to or less than a permitted value.

A transmission power control method according to an aspect of the present invention includes: controlling a transmission timing of a subframe for each component carrier (CC); and controlling transmission power in units of symbols such that a sum of the transmission power is equal to or less than a permitted value.

Advantageous Effects of Invention

According to the present invention, it is possible to prevent an increase in the error rate of PUSCH or PUCCH, deterioration in the reception quality estimation accuracy using an SRS, and complication of control in the terminal in an operation that controls a transmission timing of an uplink subframe for each CC.

DESCRIPTION OF EMBODIMENTS

Hereinafter, embodiments of the present invention will be described in detail with reference to the appended drawings.

(Embodiment 1)

[Configuration of Base Station]

Figure 1:
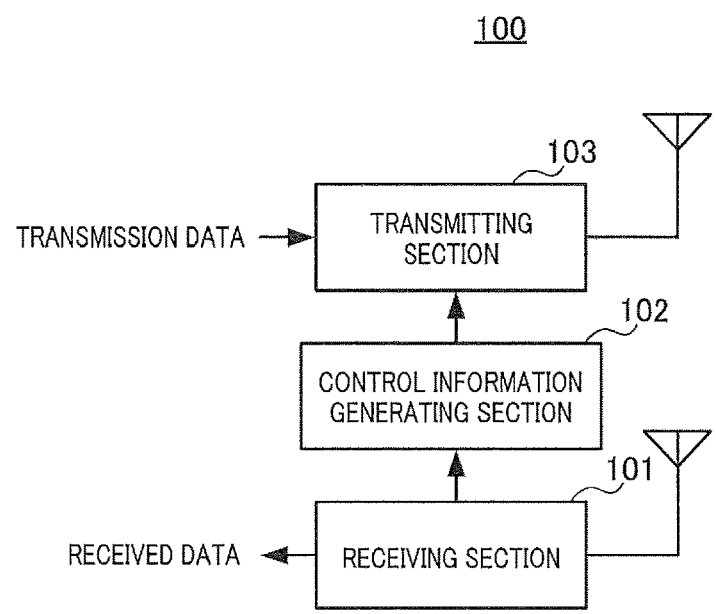
FIG. 1 is a block diagram illustrating a configuration of a base station according to Embodiment 1 of the present invention.

FIG. 1 is a block diagram illustrating a configuration of a base station according to Embodiment 1 of the present invention. Base station 100 illustrated in FIG. 1 includes receiving section 101, control information generating section 102, and transmitting section 103 as primary components.

Receiving section 101 performs a radio reception process (for example, down conversion, demodulation, and decoding) on a radio signal that has been transmitted from each terminal 200 (see FIG. 2) and then received through an antenna, and extracts PUSCH, PUCCH, SRS, and the like. Receiving section 101 outputs a data signal of the decoded PUSCH as received data. Receiving section 101 outputs control information of the decoded PUCCH to control information generating section 102. Further, receiving section 101 measures a reception timing of a signal transmitted from each terminal for each CC and outputs information representing a measurement result to control information generating section 102.

Control information generating section 102 measures a channel quality based on the SRS included in a reception signal, performs frequency scheduling for allocating a CC and an RB for transmitting the PUSCH to each terminal 200 in units of subframes according to a measurement result, generates control information representing a scheduling result, and outputs the control information to transmitting section 103. Further, control information generating section 102 generates control information of a radio resource control (RRC) layer indicating a CC (that is, a primary CC) for transmitting the PUCCH and a CC and subframe for transmitting the SRS, and outputs the control information to transmitting section 103.

Further, control information generating section 102 controls a transmission timing of a signal in each terminal for each CC so that a signal transmitted from each terminal 200 falls within a predetermined period of time (within at least a cyclic prefix (CP) length 4.7 µs) in base station 100 in consideration of a propagation delay between each terminal 200 and base station 100. Then, control information generating section 102 generates timing control information representing a control result, and outputs the timing control information to transmitting section 103. The timing control information is also called a timing advance (TA) command to indicate a transmission timing of each terminal. The TA command is transmitted through a MAC control element included in PDSCH.

Further, control information generating section 102 generates control information indicating values (for example, $P_{0\_PUSCH}$, $\alpha$, $f(i)$, $P_{0\_PUCCH}$, $\Delta_{F\_PUCCH}(F)$, $g(i)$, and $P_{SRS\_OFFSET}$) necessary to set the transmission power of the PUSCH, PUCCH, and the SRS in each terminal 200, and outputs the control information to transmitting section 103.

Furthermore, control information generating section 102 generates various kinds of control information necessary to transmit an uplink channel and a signal in terminal 200, and outputs the control information to transmitting section 103.

Transmitting section 103 performs a radio transmission process (for example, coding, modulation, and up conversion) on a Physical Downlink Shared Channel (PDSCH) including transmission data, a Physical Downlink Control Channel (PDCCH) including various kinds of control information output from control information generating section 102, a downlink reference signal, and the like, and transmits the processed data to each terminal 200 through an antenna.

[Configuration of Terminal]

Figure 2:
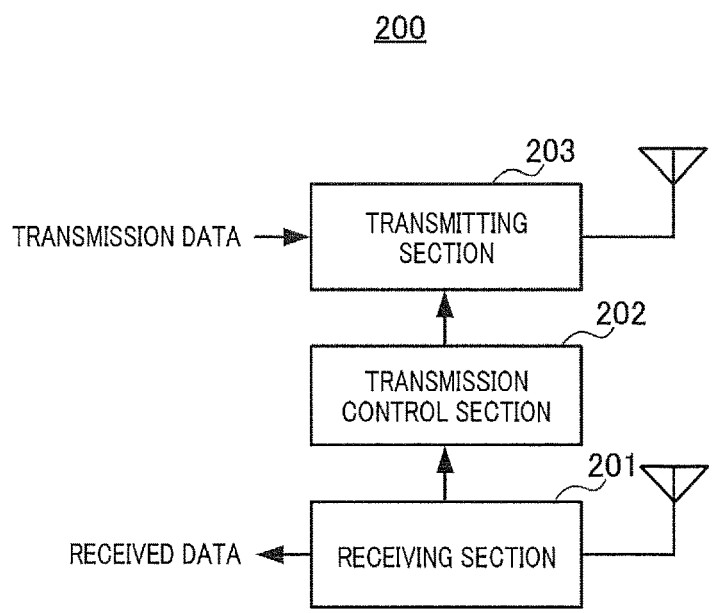
FIG. 2 is a block diagram illustrating a configuration of a terminal according to Embodiment 1 of the present invention.

FIG. 2 is a block diagram illustrating a configuration of the terminal according to Embodiment 1 of the present invention. Terminal 200 illustrated in FIG. 2 includes receiving section 201, transmission control section 202, and transmitting section 203 as main components.

Receiving section 201 performs a radio reception process (for example, down conversion, demodulation, and decoding) on a radio signal that has been transmitted from base station 100 and then received through an antenna, and extracts the PDSCH, the PDCCH, and the like. Receiving section 201 outputs a data signal of the decoded PDSCH as received data. Further, receiving section 201 outputs control information of a decoded PDCCH to transmission control section 202. Further, receiving section 201 measures reception power of a downlink reference signal, and outputs a measurement result to transmission control section 202.

Transmission control section 202 indicates, to transmitting section 203, the CC, RB, and subframe used to transmit the PUSCH according to the control information indicating the scheduling result included in the PDCCH. Further, transmission control section 202 indicates, to transmitting section 203, the CC used to transmit the PUCCH and the CC and subframe used to transmit the SRS according to the RRC layer control information.

Further, transmission control section 202 sets a transmission timing of each CC according to the timing control information of each CC included in the MAC control element in the PDSCH, and outputs information indicating the result of setting to transmitting section 203.

Further, transmission control section 202 estimates a propagation loss (pathloss) based on the reception power of the downlink reference signal and reference signal transmission power information indicated by base station 100, sets the transmission power of the PUSCH, PUCCH, and the SRS in each subframe of each CC using Equations 1 to 3, and outputs information on the set transmission power to transmitting section 203.

When the sum of the transmission power of all CCs exceeds a set permitted value, transmission control section 202 controls the transmission power not to exceed the permitted value by reducing the transmission power of a low priority channel. Further, transmission control section 202 checks whether or not transmission signals through subframes of CCs overlap based on the transmission timings of CCs, and controls the transmission power in units of symbols when the transmission signals overlap. A description of a specific transmission power setting method in transmission control section 202 will be given hereinafter.

Transmitting section 203 assigns the PUSCH, the PUCCH, and the SRS to the CC, RB, and subframe indicated by transmission control section 202. Further, transmitting section 203 controls the transmission timing of each CC according to timing information of each CC set by transmission control section 202.

Further, transmitting section 203 controls the transmission power of each CC in units of symbols such that the transmission power of each CC becomes the transmission power set by transmission control section 202. Further, transmitting section 203 performs control such that the transmission power smoothly changes within a transient period of a predetermined length when changing the transmission power. The transient period (a rising interval and a falling interval) is an interval in which the transmission power is raised or lowered when the transmission power or the transmission band (RB) changes. A description of a specific transient period setting method in transmitting section 203 will be given hereinafter.

After performing the transmission timing control and the transmission power control, transmitting section 203 performs a radio transmission process (for example, coding, modulation, and up conversion) on the PUSCH, PUCCH, and SRS, and transmits the processed data to base station 100 through an antenna.

[Transmission Power Control Method]

As described above, in the operation of Rel.11, there are cases in which among a plurality of CCs, a rear end portion of a subframe of a certain CC temporally overlaps a front end portion of a subframe of another CC, and the sum of transmission power in the overlapping portion exceeds a permitted value.

In the present embodiment, when the sum of the transmission power in a certain interval (the overlapping portion) exceeds a permitted value, terminal 200 performs control so as to lower the transmission power of a symbol including the corresponding interval in a lower priority channel

[First Specific Example]

Figure 3:
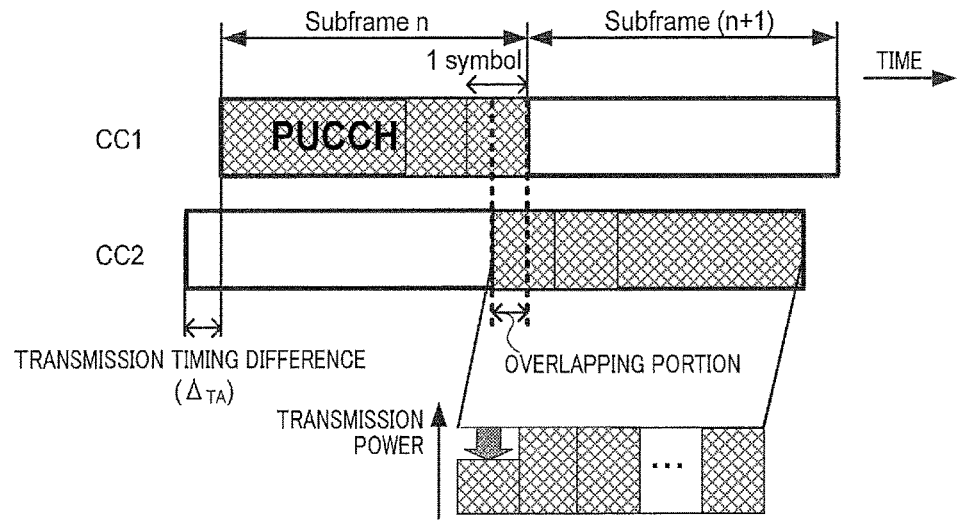
FIG. 3 is a diagram illustrating a first example for explaining a transmission power control method according to Embodiment 1 of the present invention.

FIG. 3 is a diagram illustrating a first example for explaining the transmission power control method according to the present embodiment. FIG. 3 illustrates an example in which the PUCCH of a high priority is transmitted through subframe n of CC1, the PUSCH of a low priority is transmitted through subframe (n+1) of CC2, and the transmission timing of CC2 is earlier than the transmission timing of CC1. In FIG. 3, a timing difference between CC1 and CC2 is represented by $\Delta_{T4}$.

In this case, the end portion of the PUCCH of subframe n overlaps the top portion of the PUSCH of subframe (n+1). When the sum of the transmission power in the overlapping portion exceeds a permitted value, terminal 200 lowers the transmission power of the entire symbol (the top symbol of subframe (n+1)) of the PUSCH including the portion in which the sum of the transmission power exceeds the permitted value.

[Second Specific Example]

Figure 4:
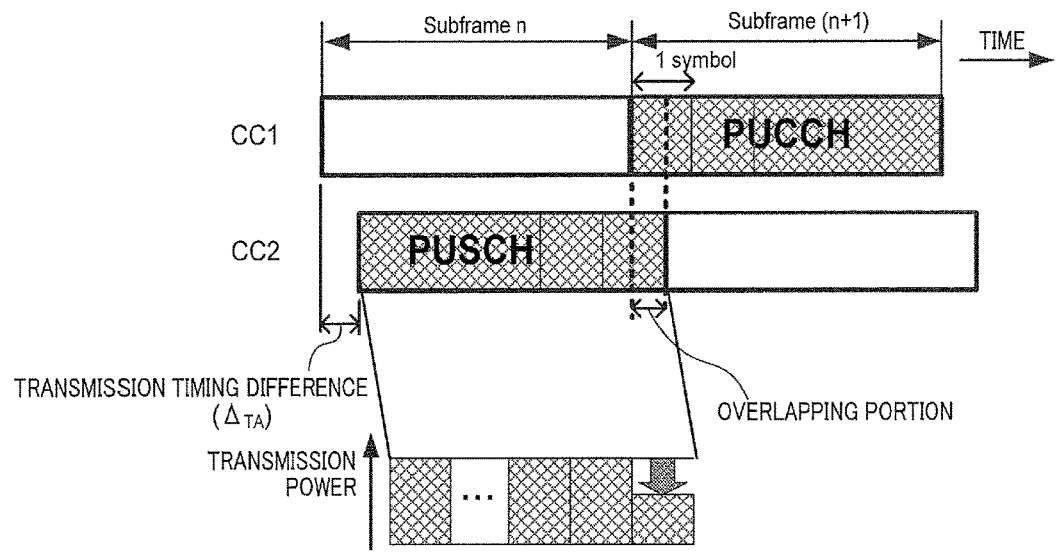
FIG. 4 is a diagram illustrating a second example for explaining the transmission power control method according to Embodiment 1 of the present invention.

FIG. 4 is a diagram illustrating a second example for explaining the transmission power control method according to the present embodiment. FIG. 4 illustrates an example in which the PUCCH of a high priority is transmitted through subframe (n+1) of CC1, the PUSCH of a low priority is transmitted through subframe n of CC2, and the transmission timing of CC2 is later than the transmission timing of CC1. In FIG. 4, the timing difference between CC1 and CC2 is represented by $\Delta_{T4}$.

In this case, the end portion of the PUSCH of subframe n overlaps the top portion of the PUCCH of subframe (n+1). When the sum of the transmission power in the overlapping portion exceeds a permitted value, terminal 200 lowers the transmission power of the entire symbol (the end symbol of subframe n) of the PUSCH including the portion in which the sum of the transmission power exceeds the permitted value.

[Third Specific Example]

Figure 5:
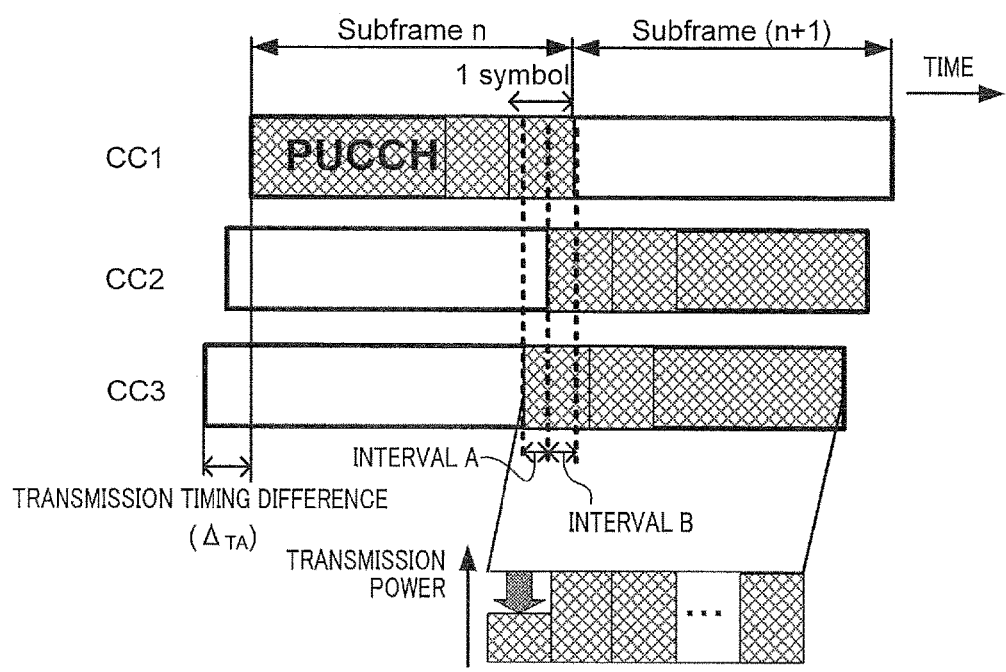
FIG. 5 is a diagram illustrating a third example for explaining the transmission power control method according to Embodiment 1 of the present invention.

FIG. 5 is a diagram illustrating a third example for explaining the transmission power control method according to the present embodiment. FIG. 5 illustrates an example in which the PUCCH of a high priority is transmitted through subframe n of CC1, the PUSCH of a low priority is transmitted through subframe (n+1) of CC2 and subframe (n+1) of CC3, the transmission timing of CC2 is earlier than the transmission timing of CC1, and the transmission timing of CC3 is earlier than the transmission timing of CC2. In FIG. 5, the timing difference between CC1 and CC3 is represented by $\Delta_{T4}$.

In this case, there are an interval A in which two CCs of CC1 and CC3 overlap and an interval B in which three CCs overlap. When the sum of the transmission power exceeds the permitted value in any of the intervals A and B, terminal 200 lowers the transmission power of the entire symbol (the top symbol of subframe (n+1)) of each PUSCH including the portion in which the sum of the transmission power exceeds the permitted value. For example, when the sum of the transmission power is higher than the permitted value by X [mW], terminal 200 lowers the transmission power of the top symbol of each of the PUSCHs transmitted through CC2 and CC3 by X/2 [mW].

Further, when the top or end symbol of the PUSCH overlaps the PUCCH on two subframes, and the sum of the transmission power on the corresponding symbol exceeds the permitted value, the transmission power of the entire symbol is lowered such that the larger sum of the transmission power can be equal to or less than the permitted value. For example, in FIG. 3, when the PUCCH is transmitted through subframe (n+1) of CC1 as well, terminal 200 sets the transmission power of the top symbol of PUSCH of CC2 such that neither the sum of the transmission power for the PUCCH of subframe n nor the sum of the transmission power for the PUCCH of subframe (n+1) exceeds the permitted value. Further, for the transmission power of a second or subsequent symbol of the PUSCH, terminal 200 lowers the transmission power of the entire symbol such that the sum of the transmission power in subframe (n+1) can be equal to or less than the permitted value, similarly to the related art.

[Effects]

As described above, in the present embodiment, the transmission power is controlled in units of symbols such that the sum of the transmission power can be equal to or less than the permitted value. Further, in the present embodiment, the transmission power of the portion in which the front end portion or the rear end portion of the subframe of a certain CC overlaps a subframe of another CC is controlled. More specifically, in two consecutive subframes of a certain CC overlapping the front end portion or the rear end portion of a subframe of another CC, the transmission power of the front end portion or the rear end portion of each of the two subframes is controlled. Particularly, in the present embodiment, the transmission power of only a symbol including a portion in which the sum of the transmission power exceeds the permitted value in a channel of the lowest priority is lowered.

As a result, there is no excessive reduction of the transmission power of the entire subframe, so that it is possible to prevent an increase in the error rate of PUSCH or PUCCH and deterioration of the reception quality estimation accuracy using an SRS.

Further, according to the present embodiment, the transmission power is set in units of symbols, so that it is possible to control the sum of the transmission power to be equal to or less than the permitted value while avoiding an increase in the updating frequency of the transmission power of the terminal, thus enabling prevention of complication of control in the terminal.

Further, when only the transmission power of a predetermined symbol in PUSCH is lowered in the case of using a modulation scheme in which information is on a phase and an amplitude such as 16QAM or 64QAM, a demodulation error is likely to occur, which may cause deterioration in the error rate because of a difference in amplitude with another symbol, particularly, a demodulation reference signal (DMRS). However, in FIGS. 3 to 5, the timing difference $\Delta_{T4}$ between CCs is mostly smaller than one symbol in most operation modes in which a cell radius is within several kilometers, so that only the transmission power of the top symbol or end symbol is lowered. Further, the transient period is set to the top symbol and end symbol, and a transmission waveform is thus distorted. For this reason, a demodulation error of a multi-level modulation occurs in any cases. Thus, the amount of further deterioration due to the lowering of the transmission power is small, so that deterioration in the error rate is considered to be small as well.

[Transient Period Setting Method]

Next, a transient period setting method in transmitting section 203 of terminal 200 will be described in detail. In LTE and LTE-Advanced, a transient period of 20 μs is set. In the present embodiment, a transient period is set to a symbol including an overlapping interval between CCs.

Figure 6:
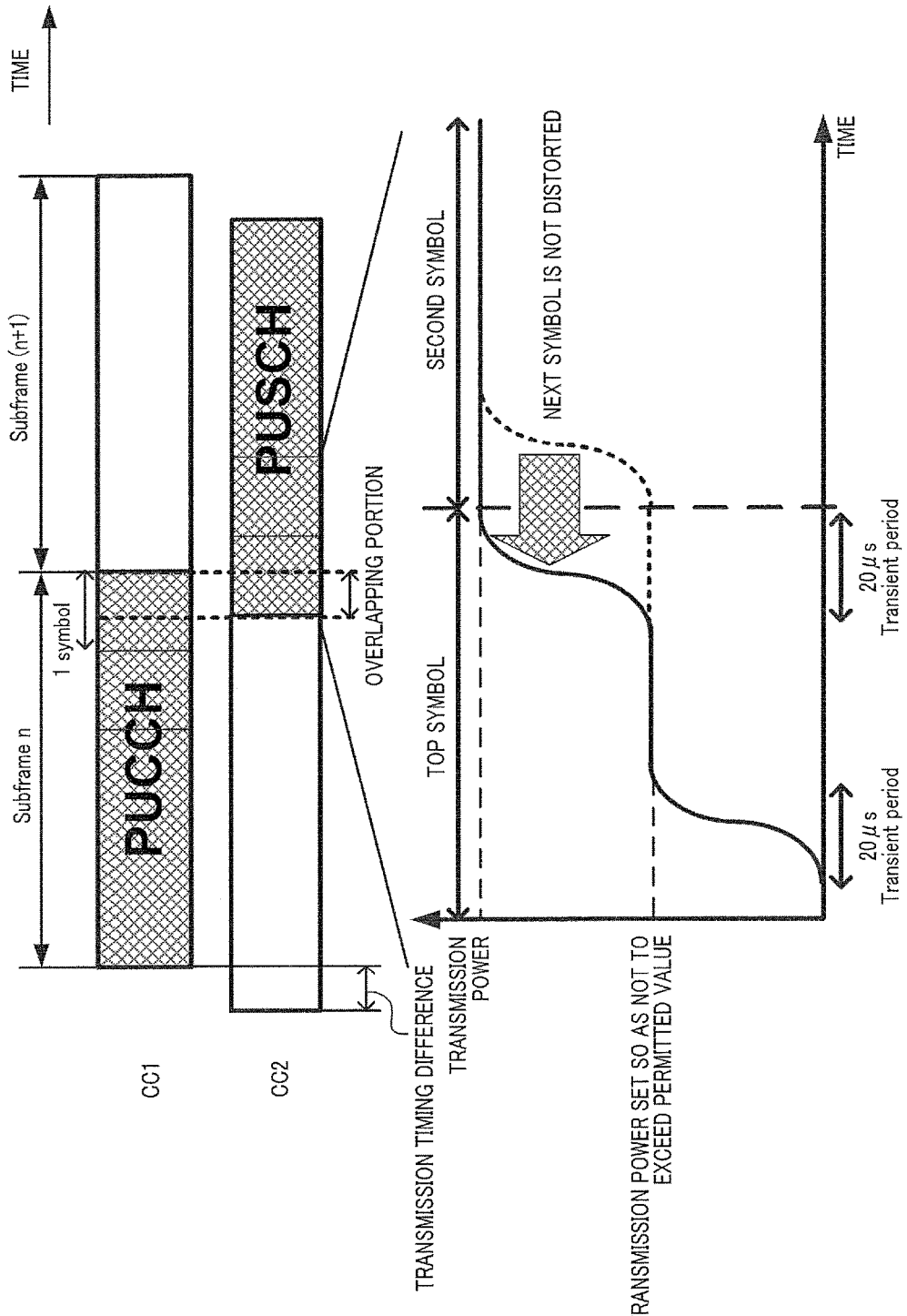
FIG. 6 is a diagram illustrating an example for explaining a transient period setting method according to Embodiment 1 of the present invention.
Figure 7:
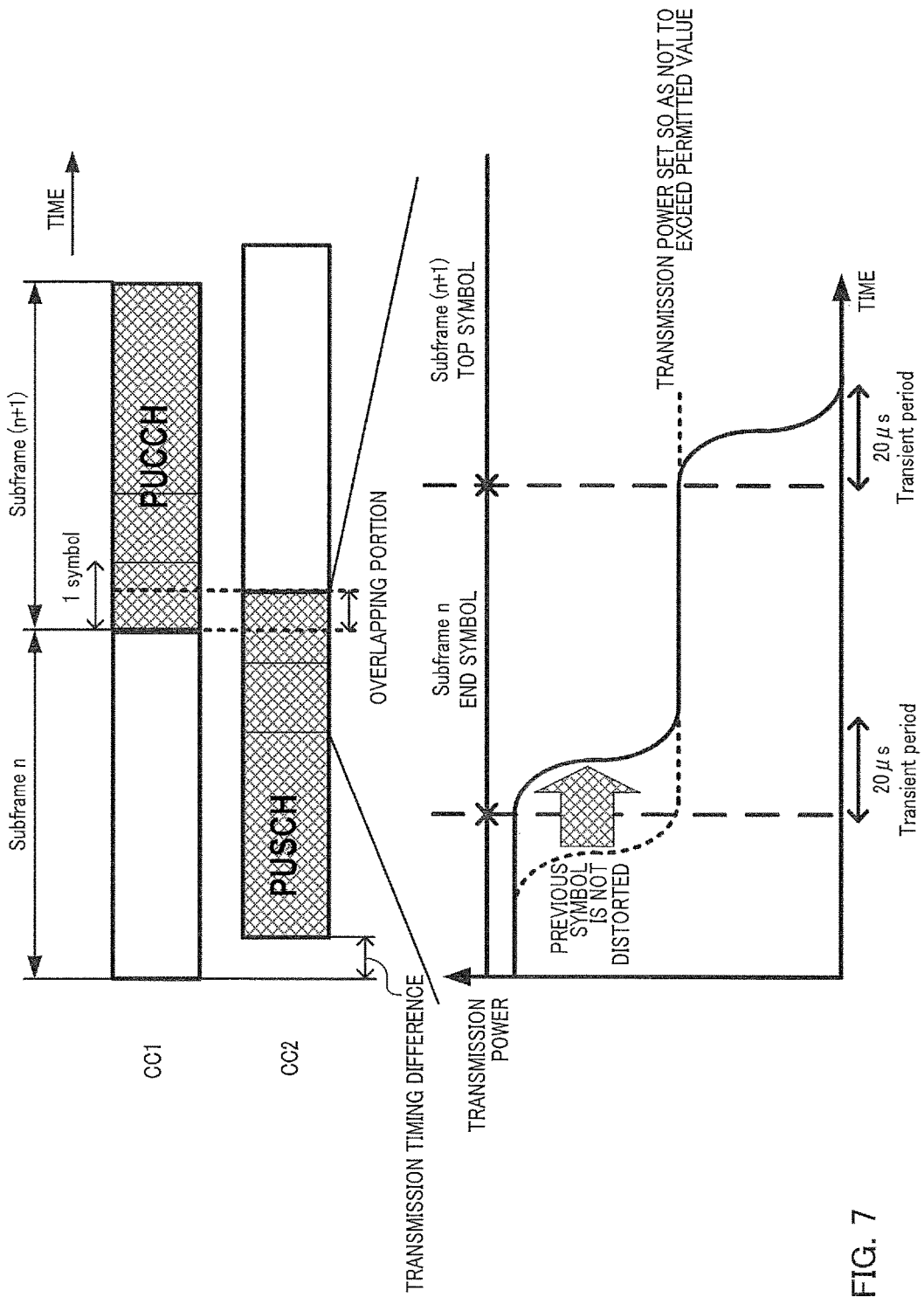
FIG. 7 is a diagram illustrating an example for explaining a transient period setting method according to Embodiment 1 of the present invention.

FIG. 6 and FIG. 7 are diagrams illustrating an example for describing a transient period setting method according to the present embodiment. FIG. 6 illustrates an example in which a transient period is set to the top portion of a subframe. FIG. 7 illustrates an example in which a transient period is set to the end portion of a subframe.

In FIG. 6, a transient period is set to the front end portion and the rear end portion of 20 μs of the top symbol. The CP not used in the demodulation process is inserted into the front end portion of each symbol. Accordingly, setting the transient period to this portion makes it possible to reduce distortion at the time of demodulation due to the influence of the transient period. Further, as the transient period is set to the rear end portion of the top symbol, the symbols immediately after the top symbol can be transmitted from the front end using desired high transmission power.

In FIG. 7, the transient period is set to the front end portion of the end symbol and the front end portion of a symbol next to the end symbol. Thus, the symbols immediately before the end symbol to the rear end can be transmitted using desired high transmission power.

[Priority Setting]

An SRS is transmitted on only one symbol per subframe. Thus, when the transmission power is lowered, the deterioration of the quality measurement accuracy of the SRS increases. Meanwhile, as described above, the signal is distorted on the top symbol or the end symbol of PUSCH where the transient period is set, so that the amount of further deterioration in the demodulation performance due to the lowering of transmission power on the symbol is small.

For this reason, terminal 200 sets a higher priority to the SRS than the priority of PUSCH. Further, when the PUSCH and SRS are simultaneously transmitted and the sum of the transmission power exceeds the pen fitted value, terminal 200 lowers the transmission power of the entire symbol of the PUSCH including the portion in which the sum of the transmission power exceeds the permitted value. Thus, it is possible to control the transmission power to be equal to or less than the permitted value while preventing an increase in deterioration of the reception quality measurement accuracy and an increase in the data error rate.

Figure 8:
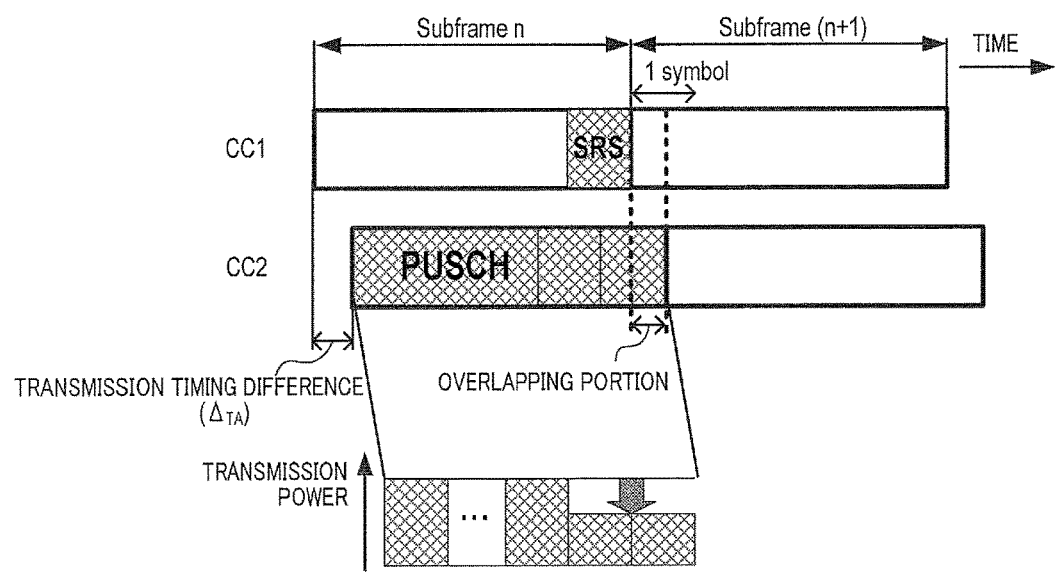
FIG. 8 is a diagram illustrating an example for explaining a transient period setting method according to Embodiment 1 of the present invention.

As illustrated in FIG. 8, when the SRS of a high priority is transmitted through the end symbol of subframe n of CC1, the PUSCH of a low priority is transmitted through subframe n of CC2, and the transmission timing of CC2 is earlier than the transmission timing of CC1, two symbols at the end of the PUSCH overlap the SRS. When the sum of the transmission power in the overlapping portion exceeds the permitted value, terminal 200 lowers the transmission power of the two symbols at the end of the PUSCH.

Further, terminal 200 sets a higher priority to the PUCCH serving as a channel for transmitting non-retransmission control information than the priority of the SRS that can be transmitted periodically. Further, when the PUCCH and SRS are simultaneously transmitted and the sum of the transmission power exceeds the permitted value, terminal 200 lowers the transmission power of the entire symbol of the SRS.

Further, when the SRS overlaps the PUCCH on two subframes and the sum of the transmission power exceeds the permitted value, the transmission power of the entire symbol of the SRS is lowered so that the larger sum of the transmission power can be equal to or less than the permitted value.

As described above, in the present embodiment, a higher priority is set in descending order of PUCCH, SRS, and PUSCH. Setting a higher priority to PUCCH than the priorities of SRS and PUSCH make it possible to prevent negative influence on a system due to an error in non-retransmission control information, particularly, a decrease in data throughput due to a delay in data transmission caused by erroneous ACK/NACK information, or deterioration of accuracy in adaptive data rate control caused by erroneous CQI information.

Further, terminal 200 may set a higher priority to SRS than the priority of PUCCH including no specific control signal (ACK/NACK information and CQI information) and set a lower priority than the PUCCH including the specific control signal. In this case, it is possible to prevent deterioration in the error rate of the non-retransmission control information while preventing an increase in deterioration of the reception quality measurement accuracy and an increase in the data error rate.

In the present invention, the priority setting method is not limited to any particular one, and the present invention can be applied to a case where the priority is set by another method. For example, among a plurality of CCs, the priority of a primary component carrier (PCC) may be set to be higher than that of a secondary component carrier (SCC). In the 3GPP specification, a CC is termed as a Cell, a PCC is termed as PCcell (primary cell), and an SCC is termed as a SCell (secondary cell) in some cases. A control channel (PUCCH) is transmitted through thee PCC, and thus the PCC is more important.

Further, base station 100 may be configured to indicate priorities between CCs to terminal 200 using RRC signaling. Further, a CC to transmit control information may be set to have a higher priority, and a CC to transmit higher priority control information may be set to have a higher priority.

(Embodiment 2)

[Overview]

Embodiment 2 is different from Embodiment 1 in the transient period setting method. A base station and a terminal according to the present embodiment have the same configurations as those illustrated in FIGS. 1 and 2.

As a transient period setting method in transmitting section 203 of terminal 200, in the present embodiment, one transient period according to a timing difference between CCs is set to a symbol of the PUSCH including the overlapping portion between the CCs. The following first and second methods are each a method for setting a transient period of the PUSCH overlapping the PUCCH, and the third setting method is a method for setting a transient period of the PUSCH overlapping the SRS.

[First Specific Example]

Figure 9:
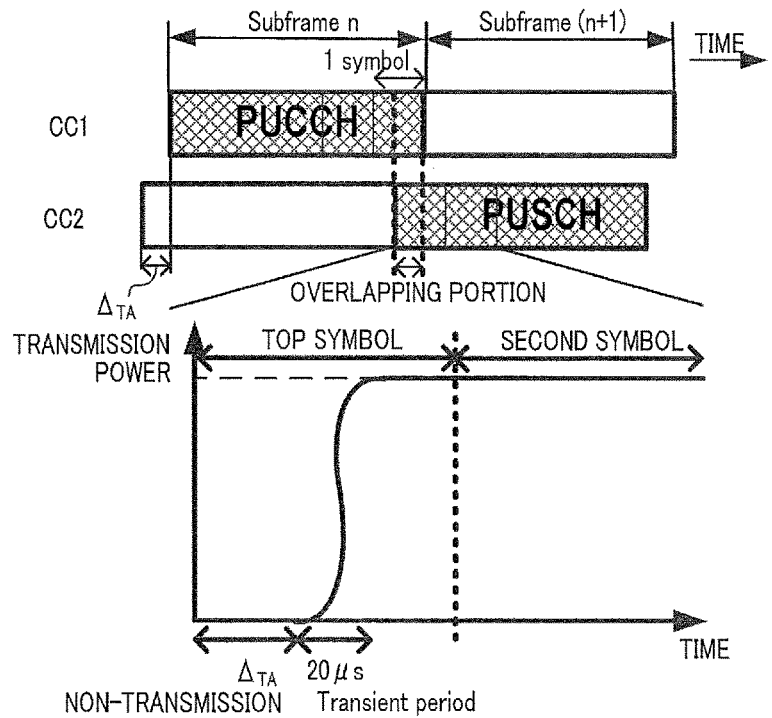
FIG. 9 is a diagram illustrating a first transient period setting method according to Embodiment 2 of the present invention.
Figure 10:
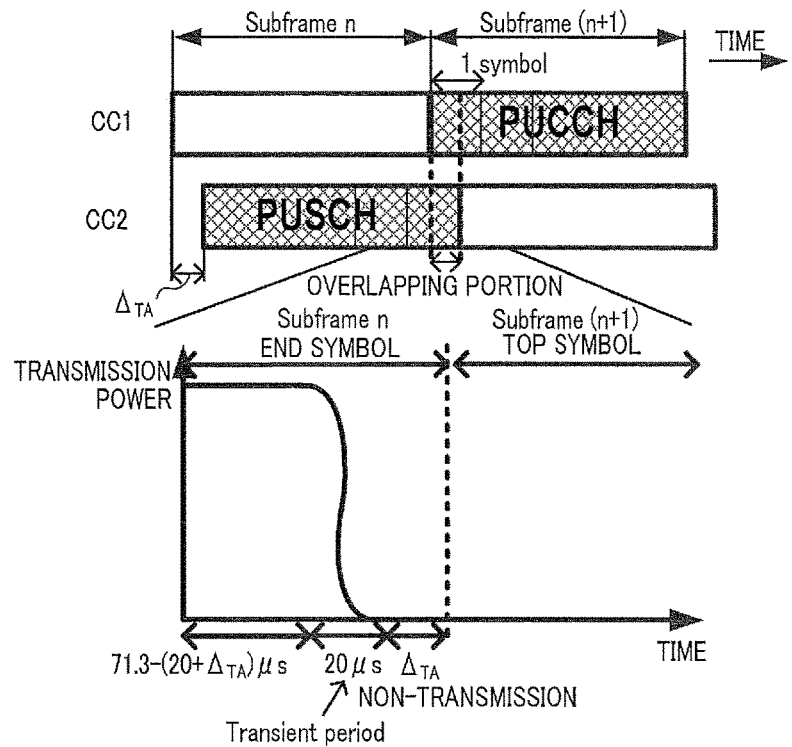
FIG. 10 is a diagram illustrating the first transient period setting method according to Embodiment 2 of the present invention.

FIGS. 9 and 10 are diagrams illustrating the first transient period setting method according to the present embodiment. FIG. 9 illustrates a case where the transient period is set to the top portion of the subframe, and FIG. 10 illustrates a case where the transient period is set to the end portion of the subframe.

In FIG. 9, the end portion of the PUCCH of subframe n overlaps the top portion of the PUSCH of subframe (n+1). When the sum of the transmission power in the overlapping portion exceeds the permitted value, terminal 200 sets $\Delta_{TA}$ (µs) from the front end of the top symbol of the PUSCH of subframe (n+1) as a non-transmission interval (the transmission power is 0), and sets 20 µs subsequent thereto as the transient period. Further, terminal 200 increases the transmission power of the PUSCH in the transient period while controlling the sum of the transmission power to be equal to or less than the permitted value.

In FIG. 10, the top portion of the PUCCH of subframe (n+1) overlaps the end portion of the PUSCH of subframe n. When the sum of the transmission power in the overlapping portion exceeds the permitted value, terminal 200 sets the transient period of 20 µs from a point in time of 71.3−(20+ $\Delta_{TA}$) µs from the front end of the end symbol of the PUSCH of subframe n, and sets a subsequent interval as the non-transmission interval (the transmission power is 0). Further, terminal 200 lowers the transmission power of the PUSCH in the transient period while controlling the sum of the transmission power to be equal to or less than the permitted value. Here, one symbol length is 71.3 µs.

As described above, in the first setting method according to the present embodiment, the overlapping portion is set as the non-transmission interval, and the transient period is set to a portion before or after the non-transmission interval. Thus, it is possible to set the transmission power of the overlapping portion such that the sum of the transmission power does not exceed the permitted value. Further, setting the non-transmission interval in this setting method allows an increase and decrease in power in a subframe to be each performed once. Thus, amplifier control in terminal 200 can be simplified. Further, in this setting method, similarly to the related art (LTE Release 8 and Release 10), the transient period of 20 µs set, so that it is possible to implement this setting method by the same amplifier design as in the related art.

[Second Specific Example]

Figure 11:
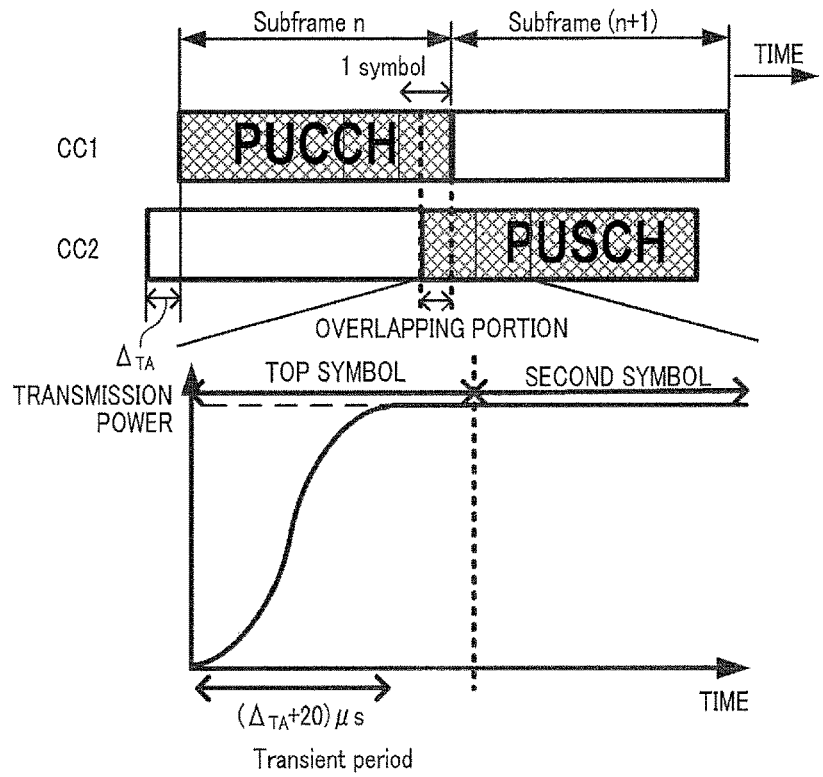
FIG. 11 is a diagram illustrating a second transient period setting method according to Embodiment 2 of the present invention.
Figure 12:
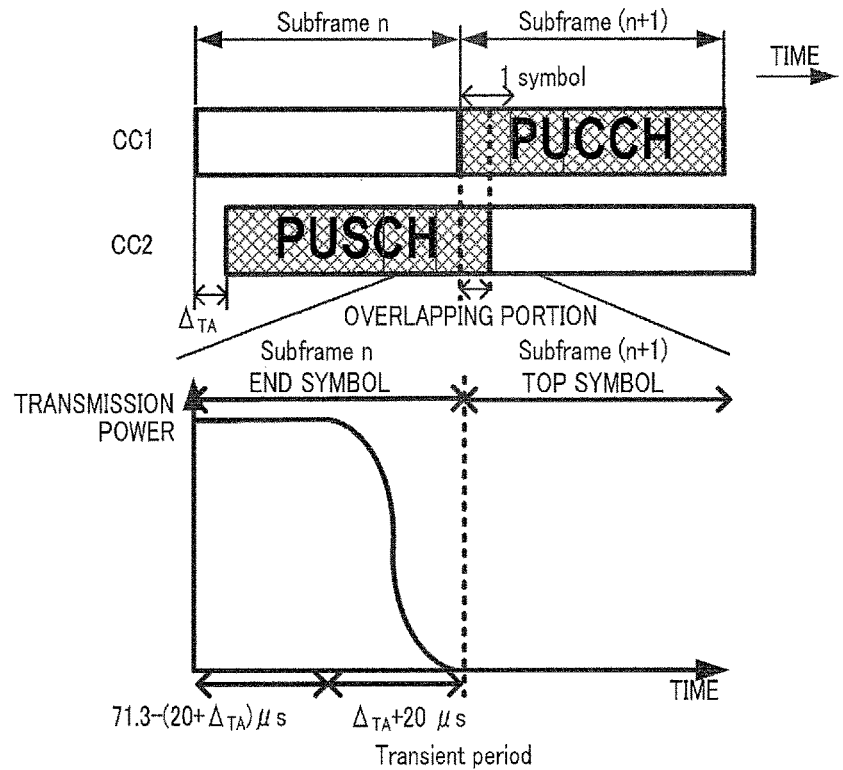
FIG. 12 is a diagram illustrating the second transient period setting method according to Embodiment 2 of the present invention.

FIG. 11 and FIG. 12 are diagrams illustrating the second transient period setting method according to the present embodiment. FIG. 11 illustrates a case where the transient period is set to the top portion of the subframe, and FIG. 12 illustrates a case where the transient period is set to the end portion of the subframe.

In FIG. 11, the end portion of the PUCCH of subframe n overlaps the top portion of the PUSCH of subframe (n+1). When the sum of the transmission power in the overlapping portion exceeds the permitted value, terminal 200 sets $\Delta_{TA}$+20 µs from the front end of the top symbol of the PUSCH of subframe (n+1) as the transient period. Further, terminal 200 increases the transmission power of the PUSCH in the transient period while controlling the sum of the transmission power to be equal to or less than the permitted value.

In FIG. 12, the top portion of the PUCCH of subframe (n+1) overlaps the end portion of the PUSCH of subframe n. When the sum of the transmission power in the overlapping portion exceeds the permitted value, terminal 200 sets $\Delta_{TA}$+20 µs from a point in time of 71.3−(20+$\Delta_{TA}$) µs from the front end of the end symbol of the PUSCH of subframe n to the rear end as the transient period. Further, terminal 200 lowers the transmission power of the PUSCH in the transient period while controlling the sum of the transmission power to be equal to or less than the permitted value.

As described above, in the second setting method according to the present embodiment, an increase and decrease in power in a subframe can be each performed only once while the transmission power of the overlapping portion is set such that the sum of the transmission power does not exceed the permitted value. Thus, amplifier control in terminal 200 can be simplified. Further, this setting method allows for a gradual increase in the transmission power from the early stage within a range in which the sum of the transmission power does not exceed the permitted value. Thus, it is possible to prevent deterioration in the error rate compared to the method of setting a non-transmission interval.

In the second setting method, $\Delta_{TA}$+20 µs is set as the transient period according to the timing difference $\Delta_{TA}$. In the present invention, however, the transient period may be fixedly set according to the maximum value (here, about 0.5 symbol=31.3 µs) of the overlapping portion.

Further, the second setting method sets the transient period of the PUSCH of a lower priority than that of PUCCH so as to extend the transient period by $\Delta_{TA}$ compared to the related art (that is, to the transient period of $\Delta_{TA}$+20 µs). The present invention is not limited to this method, however, and the transient period of an SCC may be extended always. In this case, it is possible to prevent deterioration of the reception quality of the PCC, which is more important, because of transmission of the control channel, and the terminal can always set the transient period based on the PCC in this case, so that the transmission process can be simplified.

Figure 13:
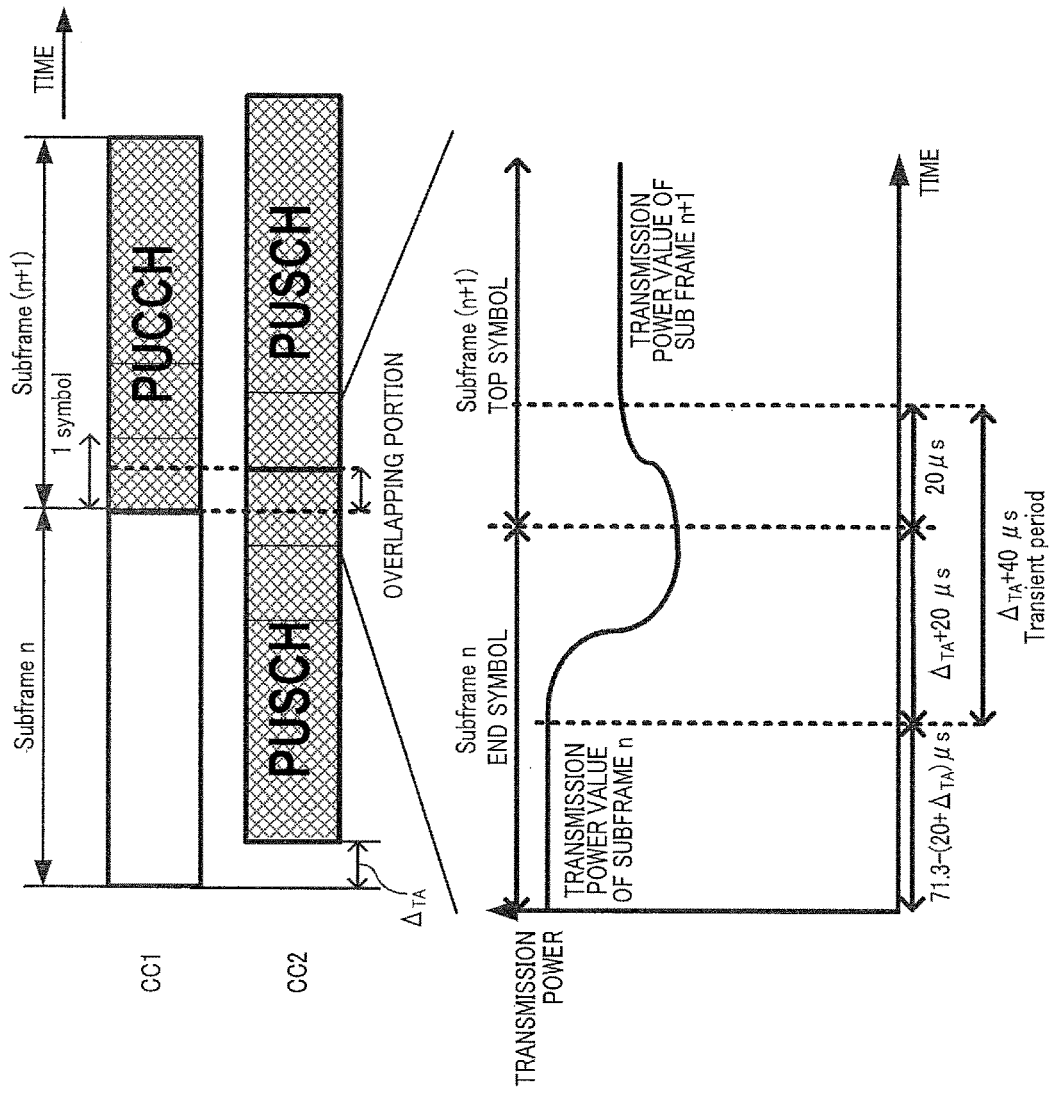
FIG. 13 is a diagram illustrating the second transient period setting method according to Embodiment 2 of the present invention.

Further, in the second setting method, when the top symbol of the PUCCH of subframe (n+1) overlaps both the end portion of the PUSCH of subframe n and the top portion of the PUSCH of subframe (n+1) as illustrated in FIG. 13, the transient period may be set over the two subframes. For example, in the case of FIG. 13, a transient period of $\Delta_{TA}$+40 µs obtained by combining an interval of $\Delta_{TA}$+20 µs from a point in time of 71.3−(20+$\Delta_{TA}$) µs from the front end of the end symbol of the PUSCH (CC2) to the rear end with an interval of 20 µs from the front end of subframe (n+1) is set. Further, in the first setting method, even when the top symbol of the PUCCH of subframe (n+) overlaps both the end portion of the PUSCH of subframe n and the top portion of the PUSCH of subframe (n+1), the extended transient period of $\Delta_{TA}$+40 µs is set.

As a result, since ON/OFF of the transmission power does not occur, it is possible to reduce unnecessary power emission outside a band.

[Third Specific Example]

Figure 14:
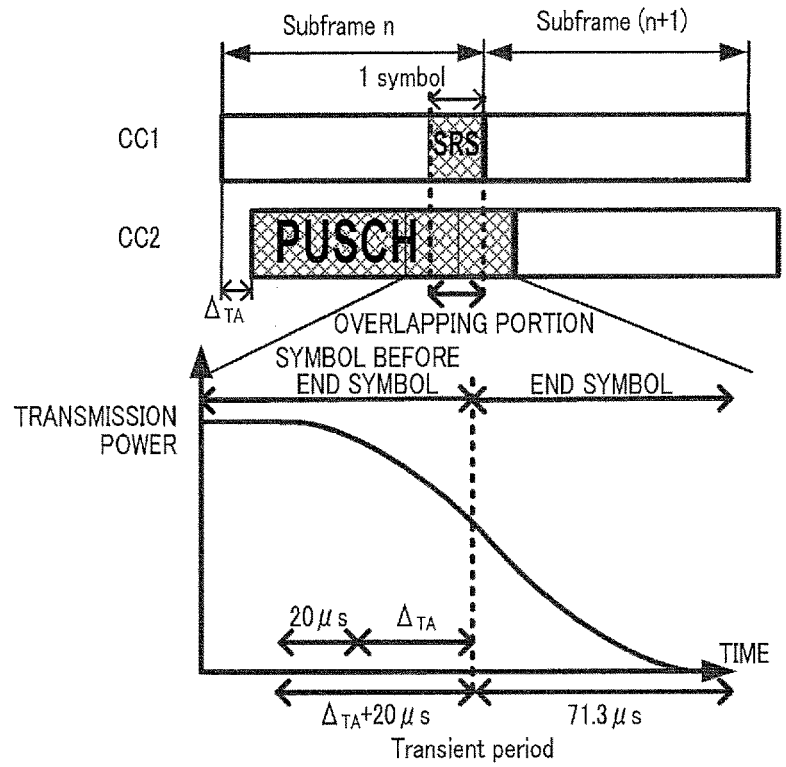
FIG. 14 is a diagram illustrating a third transient period setting method according to Embodiment 2 of the present invention.
Figure 15:
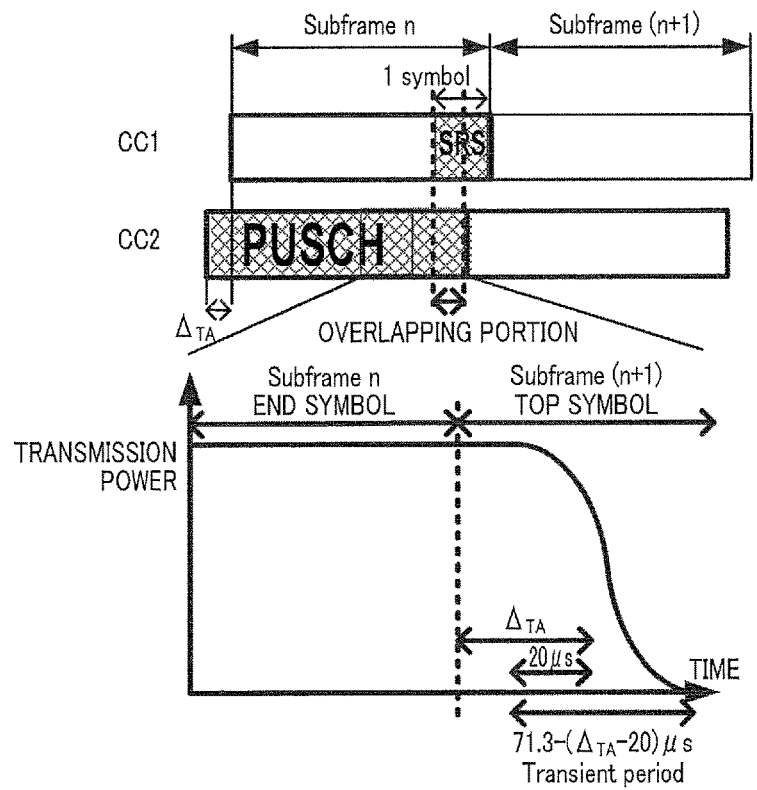
FIG. 15 is a diagram illustrating the third transient period setting method according to Embodiment 2 of the present invention.

FIG. 14 and FIG. 15 are diagrams illustrating the third transient period setting method according to the present embodiment. FIGS. 14 and 15 illustrate a case where the transient period is set to the end portion of the subframe. FIG. 14 illustrates a case where two symbols at the end of subframe n of the PUSCH overlap the SRS. FIG. 15 illustrates a case where the end symbol of subframe n of the PUSCH overlaps the SRS.

In these cases, an interval from a point in time of −($\Delta_{TA}$+20) µs from the front end of the end symbol to the rear end of the end symbol is set as the transient period.

Here, $\Delta_{TA}$=(transmission timing of PUSCH transmission CC)−(transmission timing of SRS transmission CC). In other words, $\Delta_{TA}$ has a positive value when the SRS precedes the end symbol of the PUSCH as illustrated in FIG. 14 but has a negative value when the end symbol of the PUSCH precedes the SRS as illustrated in FIG. 15.

Setting the transient period in the manner described above sets the portion overlapping the SRS as the transient period in both of the cases, so that an increase and decrease in power of a subframe can be each performed only once while the transmission power of the overlapping portion is set such that the sum of the transmission power does not exceeds the permitted value. Thus, amplifier control in terminal 200 can be simplified.

In the third method, the timing difference $\Delta_{TA}$ may be fixedly set according to the maximum value (here, about 0.5 symbol=31.3 μs) of the overlapping portion. Thus, the transmission power setting for a terminal can be simplified.

Further, when the SRS is simultaneously transmitted over the two subframes of the PUSCH, the transient period can be set in the same manner as the method illustrated in FIG. 13.

In the present embodiment, when the sum of the transmission power exceeds a permitted value, the transient period may be set so as to extend. In this case, when the sum of the transmission power does not exceed the permitted value, the transmission power is not lowered, and thus the demodulation performance of a channel or a signal improves. Further, in the present embodiment, when there is a deviation in timing (in the case of multiple TA), the transient period is always set so as to extend. In this case, the configuration of a terminal can be simplified because the transmission power setting operation can be only one regardless of whether or not the sum of the transmission power exceeds the permitted value. In addition, the overlapping portion between different subframes becomes a transient period, so that the transmission power control can be made only for a channel or signal in the same subframe. Thus, the transmission power control identical to that of Rel.10 can be used, and the configuration of the terminal can be simplified.

(Embodiment 3)

[Overview]

Embodiment 3 is different from Embodiment 1 in a transmission power setting method. The base station and terminal according to the present embodiment have the same configurations as those illustrated in FIGS. 1 and 2.

In LTE, when no channel is transmitted through the next subframe, the transient period over the top portion of the next subframe behind the end symbol is set. In this case, the end symbol is not distorted. Thus, when the transmission power of only the end symbol is lowered, deterioration of the demodulation accuracy at the time of multi-level modulation such as 16QAM or 64QAM increases.

In this regard, in the present embodiment, when the sum of the transmission power in the end portion of a channel of a low priority exceeds the permitted value, the transmission power of the entire subframe (or the entire channel of a low priority) is lowered. Further, when the sum of the transmission power in the top portion of a channel of a low priority exceeds the permitted value, as in Embodiment 1, only the transmission power of a symbol including a portion overlapping a channel of a high priority is lowered.

[First Specific Example]

Figure 16:
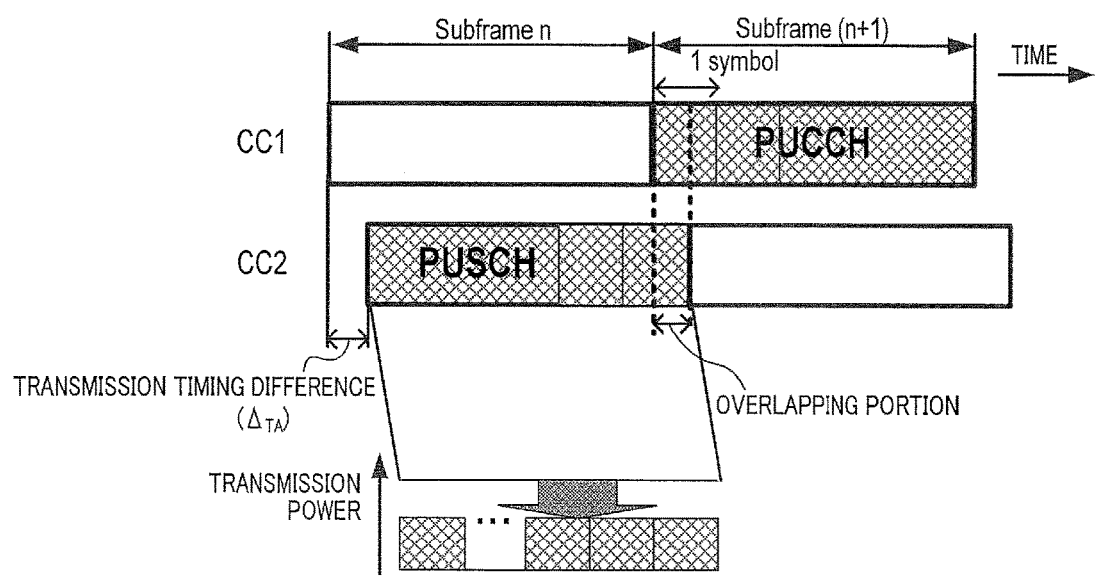
FIG. 16 is a diagram illustrating a first example for explaining a transmission power control method according to Embodiment 3 of the present invention.

FIG. 16 is a diagram illustrating a first example for explaining the transmission power control method according to the present embodiment. FIG. 16 illustrates an example in which the PUCCH of a high priority is transmitted through subframe (n+1) of CC1, the PUSCH of a low priority is transmitted through subframe n of CC2, and the transmission timing of CC2 is later than the transmission timing of CC1. In FIG. 16, a timing difference between CC1 and CC2 is represented by $\Delta_{TA}$.

In this case, the end portion of the PUSCH of subframe n overlaps the top portion of the PUCCH of subframe (n+1). When the sum of the transmission power in the overlapping portion exceeds the permitted value, terminal 200 lowers the transmission power of the entire subframe n of the PUSCH.

[Second Specific Example]

Figure 17:
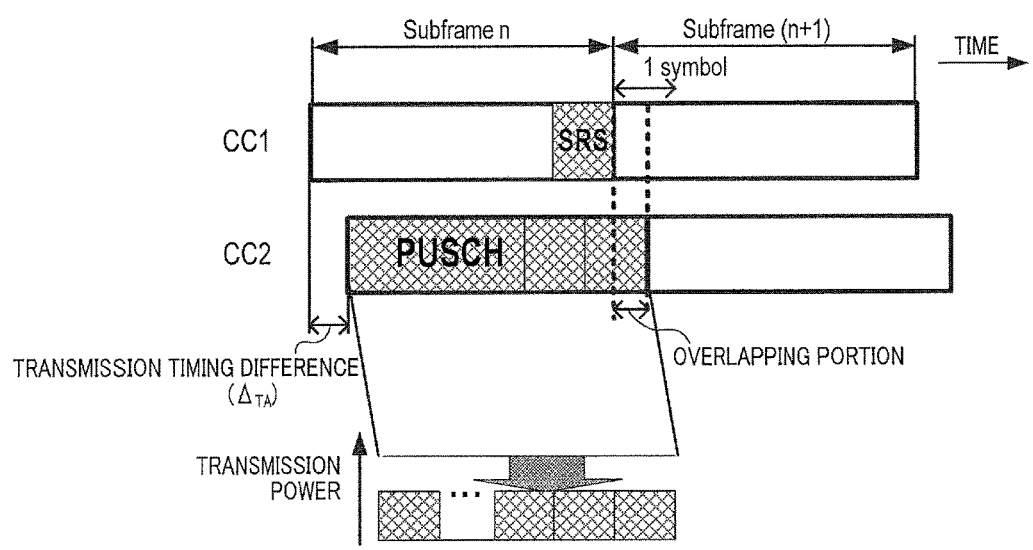
FIG. 17 is a diagram illustrating a second example for explaining the transmission power control method according to Embodiment 3 of the present invention.

FIG. 17 is a diagram illustrating a second example for explaining the transmission power control method according to the present embodiment. FIG. 17 illustrates a case where the SRS of a high priority is transmitted through the end symbol of subframe n of CC1, the PUSCH of a low priority is transmitted through subframe n of CC2, and the transmission timing of CC2 is earlier than the transmission timing of CC1. In FIG. 17, a timing difference between CC1 and CC2 is represented by $\Delta_{TA}$.

In this case, the two symbols at the end of the PUSCH overlap the SRS in the same subframe. When the sum of the transmission power in the overlapping portion exceeds the permitted value, terminal 200 lowers the transmission power of the entire subframe n of the PUSCH.

[Effects]

As described above, in the present embodiment, when the sum of the transmission power in the end portion of a channel of a low priority exceeds the permitted value, it is possible to prevent an increase in deterioration of the error rate by lowering the transmission power of the entire subframe of the channel of a low priority. Further, the error rate may deteriorate due to the lowering of the transmission power of the entire subframe, but it is possible to prevent an increase in deterioration of the error rate by lowering the coding rate. However, when there are many modulation symbols of different transmission power, the amount of improvement of the error rate is small even if the coding rate is lowered.

[Others]

Further, when the end portion of the PUSCH of subframe n and the top portion of the PUSCH of subframe (n+1) overlap the SKS, and the sum of the transmission power in the overlapping portion exceeds the permitted value, terminal 200 may lower the transmission power of the entire subframe n and the entire top symbol of subframe (n+1) of the PUSCH.

Further, when the sum of the transmission power in the end portion of a channel of a low priority exceeds the permitted value, only the transmission power of a symbol including the overlapping portion may be lowered in case of a QPSK modulation scheme, and the transmission power of the entire subframe may be lowered in case of a 16QAM or 64QAM modulation scheme.

Further, in the present embodiment, the transmission power of the entire subframe of a channel of a low priority may be lowered, and the transient period may be set.

(Embodiment 4)

[Overview]

Embodiments 1 to 3 have been described with the transmission power setting method when channels of different priorities overlap. Embodiment 4 will be described with a transmission power setting method when channels of the same priority overlap. Further, the base station and terminal according to the present embodiment have the same configuration as those illustrated in FIGS. 1 and 2.

When channels of the same priority overlap between different subframes of different CCs, and the sum of the transmission power in the overlapping portion exceeds the permitted value, terminal 200 lowers the transmission power of the entire top symbol of a subsequent subframe.

[Specific Example]

Figure 18:
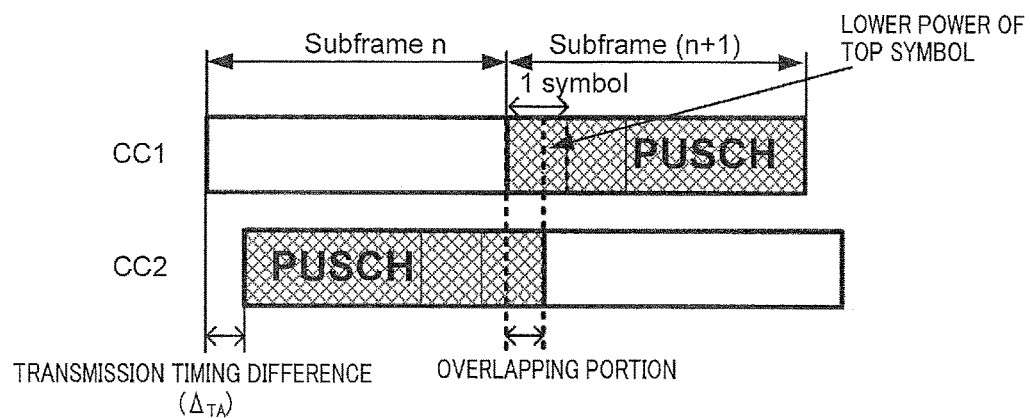
FIG. 18 is a diagram illustrating an example for explaining a transmission power control method according to Embodiment 4 of the present invention.

FIG. 18 is a diagram illustrating an example for explaining the transmission power control method according to the present embodiment. FIG. 18 illustrates an example in which the PUSCH is transmitted through subframe (n+1) of CC1 and subframe n of CC2, and the transmission timing of CC2 is later than the transmission timing of CC1. In FIG. 18, the timing difference between CC1 and CC2 is represented by $\Delta_{TA}$.

In this case, the end portion of subframe n of CC2 overlaps the top portion of subframe (n+1) of CC1. When the sum of the transmission power in the overlapping portion exceeds the permitted value, terminal 200 lowers the transmission power of the entire top symbol of a subsequent subframe, that is, subframe (n+1) of CC1.

[Effects]

Since the transient period is always set to the top symbol of the subframe, the top symbol of the subframe is more likely to be distorted than the end symbol. Thus, in the case of overlapping, lowering the transmission power of the top symbol of the subsequent subframe makes it possible to prevent an increase in the amount of deterioration of the error rate.

Further, the priority of the PUSCH including control information (UCI) may be set to be higher than the priority of the PUSCH having no UCI, and when the priorities are the same, the transmission power control method may be executed only when the PUSCHs having the UCI overlap or the PUSCHs having no UCI overlap.

The embodiments of the present invention have been described above.

The above embodiments have been described under the assumption that the timing difference between CCs is 31.3 µs, that is, the timing difference is within the SC-FDMA symbol length of 71.3 µs, but the present invention can be applied even in the case of a timing difference greater than the timing difference. In this case, when the sum of the transmission power exceeds the permitted value, the transmission power of a plurality of symbols from the top or end of the subframe of the channel of a low priority is lowered.

Further, the embodiments have been described above with a case where the symbol length is 71.3 µs, but the present invention is not limited to this case, and can be applied to any other cases. Further, in LTE, in the case of normal CP, the symbol length of the top SC-FDMA symbol is 71.9 µs, and the symbol lengths of the other SC-FDMA symbols are 71.3 µs.

Further, the embodiments have been described with a case where timing control is performed for each CC, but the present invention is not limited to this case, and timing control may be performed for each CC group aggregating a plurality of CCs. In this case, base station 100 indicates timing control information to terminal 200 for each CC group.

In the embodiments described above, the present invention is configured using hardware by way of example, but the invention may also be provided by software.

In addition, the functional blocks used in the description of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

As has been described above, a radio communication terminal apparatus according to this disclosure includes: a control section that controls a transmission timing and transmission power of a subframe for each component carrier (CC); and a transmitting section that transmits a signal at the controlled transmission timing and transmission power, in which the control section controls the transmission power in units of symbols such that a sum of the transmission power is equal to or less than a permitted value.

In the radio communication terminal apparatus according to this disclosure, the control section controls transmission power of an overlapping portion where a front end portion or a rear end portion of a subframe of a first CC and a subframe of a second CC overlap.

In the radio communication terminal apparatus according to this disclosure, the control section controls transmission power of a front end portion or a rear end portion of each of two consecutive subframes respectively of a first CC and a second CC that overlaps the front end portion or the rear end portion of the subframe of the first CC.

In the radio communication terminal apparatus according to this disclosure, the control section performs control such that transmission power of a signal of a lowest priority is lowered.

In the radio communication terminal apparatus according to this disclosure, the control section sets a higher priority to a Sounding Reference Signal (SRS) than a priority of a Physical Uplink Shared Channel (PUSCH).

In the radio communication terminal apparatus according to this disclosure, the control section sets a transient period to a symbol whose transmission power is lowered.

In the radio communication terminal apparatus according to this disclosure, the control section sets the transient period after a predetermined time interval in a top symbol.

In the radio communication terminal apparatus according to this disclosure, the control section sets the transient period before a predetermined time interval in an end symbol.

In the radio communication terminal apparatus according to this disclosure, the control section sets the transmission power to zero in the predetermined time interval.

In the radio communication terminal apparatus according to this disclosure, the predetermined time interval is a difference in transmission timing between CCs.

In the radio communication terminal apparatus according to this disclosure, the control section sets the transient period to be longer by a period corresponding a difference in transmission timing between CCs.

In the radio communication terminal apparatus according to this disclosure, the control section sets the transient period to be longer by a period corresponding to one symbol length when the number of symbols whose transmission power is lowered is two or more.

In the radio communication terminal apparatus according to this disclosure, when lowering transmission power of an end symbol of a subframe, the control section lowers transmission power of an entirety of the subframe including the end symbol.

In the radio communication terminal apparatus according to this disclosure, when lowering transmission power of two or more symbols, the control section lowers transmission power of an entire subframe including the two or more symbols.

In the radio communication terminal apparatus according to this disclosure, when a rear end portion of a subframe of a first CC overlaps one subframe of a second CC, the control section lowers transmission power of an entirety of the one subframe of the second CC.

In the radio communication terminal apparatus according to this disclosure, when a sum of transmission power in an overlapping portion between signals of an identical priority exceeds the permitted value, the control section lowers transmission power of a top symbol of a subsequent subframe.

A transmission power control method according to this disclosure includes: controlling a transmission timing of a subframe for each component carrier (CC); and controlling transmission power in units of symbols such that a sum of the transmission power is equal to or less than a permitted value.

The disclosure of the specification, the drawings, and the abstract included in Japanese Patent Application No. 2012-016409 filed on Jan. 30, 2012 is incorporated herein by reference in their entirety.

INDUSTRIAL APPLICABILITY

The present invention is applicable to mobile communication systems that control the transmission timing of uplink subframes for each CC, for example.

REFERENCE SIGNS LIST

100 Base station
101 Receiving section
102 Control information generating section
103 Transmitting section
200 Terminal
201 Receiving section
202 Transmission control section
203 Transmitting section

The invention claimed is:

1. A radio communication terminal apparatus, comprising:
  a control circuit, which, in operation, controls a transmission timing and a transmission power of a first subframe on a first component carrier (CC) out of multiple CCs,
  wherein the first subframe on the first CC overlaps with a second subframe on a second CC along a time axis to form an overlapping portion,
  said controlling of the transmission timing and the transmission power of the first subframe on the first CC includes adjusting the transmission power of the first subframe on the first CC in units of symbols within the first subframe so that a sum of the transmission powers of the first subframe on the first CC and the second subframe on the second CC at the overlapping portion does not exceed a permitted value,
  in a case where the overlapping portion is an initial symbol in the first subframe overlapping a last symbol in the second subframe, said controlling of the transmission timing and the transmission power of the first subframe on the first CC includes
    lowering the transmission power of the initial symbol in the first subframe for a predetermined time interval starting from a beginning of the initial symbol in the first subframe,
    starting, subsequent to the predetermined time interval, a transmission power transient period, and
    increasing, subsequent to the transmission power transient period, the transmission power of the initial symbol in the first subframe such that a sum of the transmission powers of the initial symbol in the first subframe and the last symbol in the second subframe at the overlapping portion does not exceed the permitted value, and
  the predetermined time interval is set according to a time difference between a transmission time of the first CC and a transmission time of the second CC; and
  a transmission circuit coupled to the control circuit which, in operation, transmits a signal at the controlled transmission timing with the controlled transmission power in the first subframe on the first CC.

2. The radio communication terminal apparatus according to claim 1, wherein the overlapping portion is a front end portion or a rear end portion of the first subframe of the first CC.

3. The radio communication terminal apparatus according to claim 1, wherein the control circuit controls a transmission power of a third subframe on a third CC, which overlaps with the second subframe on the second CC at the overlapping portion, by adjusting the transmission power of the third subframe in units of symbols within the third subframe so that the sum of the transmission powers of the first, second and third subframes at the overlapping portion does not exceed the permitted value.

4. The radio communication terminal apparatus according to claim 1, wherein the first subframe on the first CC has a lower priority than the second subframe on the second CC.

5. The radio communication terminal apparatus according to claim 4, wherein the control circuit sets a higher priority to a Sounding Reference Signal (SRS) than a priority of a Physical Uplink Shared Channel (PUSCH).

6. The radio communication terminal apparatus according to claim 1, wherein the control circuit sets the transmission power transient period for a symbol whose transmission power is lowered.

7. The radio communication terminal apparatus according to claim 6, wherein the control circuit sets the transmission power transient period that ends at the predetermined time interval from an end of a last symbol in the first subframe.

8. The radio communication terminal apparatus according to claim 6, wherein the control circuit sets the transmission power transient period that starts at the predetermined time interval from the beginning of the initial symbol in the first subframe.

9. The radio communication terminal apparatus according to claim 8, wherein the control circuit sets the transmission power to zero in the predetermined time interval.

10. The radio communication terminal apparatus according to claim 6, wherein the control circuit sets the transmission power transient period to be longer by a period corresponding to a difference in transmission timings between the first and second subframes.

11. The radio communication terminal apparatus according to claim 6, wherein the control circuit sets the transmission power transient period to be longer by a period corresponding to one symbol length when lowering transmission powers of two or more symbols in the first subframe.

12. The radio communication terminal apparatus according to claim 8, wherein the lowering of the transmission power of the initial symbol in the first subframe includes setting the transmission power of the initial symbol in the first subframe to zero.

13. The radio communication terminal apparatus according to claim 1, wherein, when lowering a transmission power of a last symbol of the first subframe, the control circuit lowers a transmission power of an entirety of the first subframe including the last symbol.

14. The radio communication terminal apparatus according to claim 1, wherein when lowering a transmission power of two or more symbols of the first subframe, the control circuit lowers a transmission power of an entirety of the first subframe including the two or more symbols.

15. The radio communication terminal apparatus according to claim 1, wherein when a rear end portion of the first subframe on the first CC overlaps with the second subframe on the second CC, the control circuit lowers a transmission power of an entirety of the first subframe on the first CC.

16. The radio communication terminal apparatus according to claim 1, wherein when the first and second subframes have an identical priority, the control circuit lowers a transmission power of the initial symbol of the first subframe that is after the second subframe along the time axis.

17. A transmission power control method, comprising:
controlling a transmission timing and a transmission power of a first subframe on a first component carrier (CC) out of multiple CCs,
wherein the first subframe on the first CC overlaps with a second subframe on a second CC along a time axis to form an overlapping portion,
said controlling of the transmission timing and the transmission power of the first subframe on the first CC includes adjusting the transmission power of the first subframe on the first CC in units of symbols within the first subframe so that a sum of the transmission powers of the first subframe on the first CC and the second subframe on the second CC at the overlapping portion does not exceed a permitted value,
in a case where the overlapping portion is an initial symbol in the first subframe overlapping a last symbol in the second subframe, said controlling of the transmission timing and the transmission power of the first subframe on the first CC includes
lowering the transmission power of the initial symbol in the first subframe for a predetermined time interval starting from a beginning of the initial symbol in the first subframe,
starting, subsequent to the predetermined time interval, a transmission power transient period, and
increasing, subsequent to the transmission power transient period, the transmission power of the initial symbol in the first subframe such that a sum of the transmission powers of the initial symbol in the first subframe and the last symbol in the second subframe at the overlapping portion does not exceed the permitted value, and
the predetermined time interval is set according to a time difference between a transmission time of the first CC and a transmission time of the second CC; and
transmitting a signal at the controlled transmission timing with the controlled transmission power in the first subframe on the first CC.

18. The radio communication terminal apparatus according to claim 1, wherein
in a case where the overlapping portion is a last symbol in the first subframe overlapping an initial symbol in the second subframe, said controlling of the transmission timing and the transmission power of the first subframe on the first CC includes
starting a transmission power transient period, and
lowering the transmission power of the initial symbol in the first subframe for the predetermined time interval starting from an ending of the transmission power transient period.

* * * * *